United States Patent [19]

Macedo et al.

[11] Patent Number: 4,659,477
[45] Date of Patent: Apr. 21, 1987

[54] FIXATION OF ANIONIC MATERIALS WITH A COMPLEXING AGENT

[75] Inventors: Pedro B. Macedo, 6100 Highboro Dr., Bethesda, Md. 20817; Aaron Barkatt, Silver Spring, Md.

[73] Assignees: Pedro B. Macedo, Bethesda; Theodore A. Litovitz, Annapolis, both of Md.

[21] Appl. No.: 517,472

[22] Filed: Jul. 28, 1983

Related U.S. Application Data

[63] Continuation-in-part of Ser. No. 408,162, Aug. 16, 1982, abandoned.

[51] Int. Cl.$^4$ .......................... B01D 15/04; G21F 9/02; G21F 9/12; B01J 20/02
[52] U.S. Cl. .................................... 210/679; 210/682; 210/684; 252/628; 252/629; 252/630; 252/631; 502/407; 502/417
[58] Field of Search ............... 252/628, 629, 630, 631; 502/407, 416, 417; 210/660, 679, 682, 683, 684

[56] References Cited

U.S. PATENT DOCUMENTS

| | | | |
|---|---|---|---|
| 2,106,744 | 2/1938 | Hood et al. | 106/36.1 |
| 2,221,709 | 11/1940 | Hood et al. | 106/36.1 |
| 2,272,342 | 2/1942 | Hyde | 49/78.1 |
| 2,326,059 | 8/1943 | Nordberg | 106/52 |
| 2,336,227 | 12/1943 | Dalton | 49/79 |
| 2,340,013 | 1/1944 | Nordberg et al. | 49/79 |
| 3,147,225 | 9/1964 | Ryan | 252/301.1 |
| 3,332,737 | 7/1967 | Kraus | 23/50 |
| 3,382,034 | 5/1968 | Kraus | 23/50 |
| 3,522,187 | 7/1970 | Kraus | 252/182 |
| 3,772,189 | 11/1973 | Kreusch et al. | 210/40 |
| 3,838,554 | 10/1974 | Wilhelm et al. | 55/71 |
| 3,911,413 | 10/1975 | Wallace | 340/632 |
| 3,923,688 | 12/1975 | Hammel et al. | 252/432 |
| 3,959,172 | 5/1976 | Brownell et al. | 252/301.1 W |
| 3,969,261 | 7/1976 | Meiller | 252/179 |
| 4,072,709 | 2/1978 | Tinker | 560/103 |
| 4,088,737 | 5/1978 | Thomas et al. | 423/240 |
| 4,110,093 | 8/1978 | Macedo et al. | 65/3 R |
| 4,110,096 | 8/1978 | Macedo et al. | 65/30 R |
| 4,119,671 | 10/1978 | Bauer et al. | 568/432 |
| 4,156,658 | 5/1979 | Mercer, Jr. et al. | 252/301.1 W |
| 4,178,270 | 12/1979 | Fujita et al. | 252/447 |
| 4,196,173 | 4/1980 | de Jong et al. | 423/210 M |
| 4,198,296 | 4/1980 | Doumas et al. | 210/501 |
| 4,204,980 | 5/1980 | Pasha et al. | 252/428 |
| 4,209,421 | 6/1980 | Meimerl et al. | 252/301.1 W |
| 4,224,177 | 9/1980 | Macedo et al. | 252/301.1 W |
| 4,234,456 | 11/1980 | Kamiya et al. | 252/438 |
| 4,237,306 | 12/1980 | White et al. | 560/55 |
| 4,267,178 | 5/1981 | Regnier et al. | 424/270 |
| 4,312,647 | 1/1982 | Tsuchiya et al. | 55/387 |
| 4,312,774 | 1/1982 | Macedo et al. | 252/629 |
| 4,333,847 | 6/1982 | Tran et al. | 252/629 |
| 4,338,215 | 7/1982 | Shaffer et al. | 252/628 |
| 4,362,659 | 12/1982 | Macedo et al. | 252/629 |
| 4,362,660 | 12/1982 | Partridge et al. | 252/631 |
| 4,376,070 | 3/1983 | Pope et al. | 252/629 |
| 4,377,507 | 3/1983 | Pope et al. | 252/629 |
| 4,382,879 | 5/1983 | Funabashi et al. | 252/457 |
| 4,389,233 | 6/1983 | Kurosaki et al. | 63/31 |
| 4,394,354 | 7/1983 | Joyce | 210/684 X |
| 4,454,332 | 6/1984 | Liu et al. | 560/170 |
| 4,469,628 | 9/1984 | Simmons et al. | 252/629 |

FOREIGN PATENT DOCUMENTS

| 1389905 | 4/1975 | United Kingdom | 252/626 |
| 1513964 | 6/1978 | United Kingdom | 252/626 |

OTHER PUBLICATIONS

Yoldas, J. Mater. Sci., 14, 1843 (1979).
Yoldas, J. Non-Cryst. Solids, 38, 81 (1980).
Mukherjee, Materials Processing in the Reduced Gravity Environment of Space, Elsevier, 1982.
McGraw-Hill Encyclopedia of Science and Technology, McGraw-Hill, Inc., New York, N.Y., 1977, vol. 14, p. 696.
K. H. Lin, "Use of Ion Exchange for the Treatment of Liquids in Nuclear Power Plants", ORNL-4792 (Dec. 1973).
J. Weisman et al, "The Saxton Chemical Skim Experiments", WCAP-3269-24 (Jul. 1965).
W. D. Fletcher, "Ion Exchange in Boric Acid Solutions with Radioactive Decay", WCAP-3716 (Nov. 1962).
Chemical Abstracts, Abstract 87207w, Applicability of Inorganic Sorbents for Trapping Radioiodine from LMFBR Fuel Reprocessing Off-Gas, vol. 80, Apr. 1–22, 1974.
Holladay, "Methods for the Removal of Iodine Species from Off-Gases and Liquid Waste Streams of Nuclear Power and Nuclear Fuel Reprocessing Plants", ORNL/TM-6350, Jan. 1979, pp. 53, 55 and 157.
Amphlett, "Hydrous Oxides and Insoluble Salts", *Inorganic Ion Exchangers*, Chapter 5, pp. 84–93, 1964.
Clearfield, "Oxides and Hydrous Oxides of Multivalent Metals as Inorganic Ion Exchangers", *Inorganic Ion Exchange Materials*, 1982, pp. 161–164.
Sorum, Fundamentals of General Chemistry, Second Edition, Aug. 1964, pp. 601, Group IB Elements and 655.
Sisler, General Chemistry—A Systematic Approach, Second Edition, 1959, pp. 202–206, 686–687, 726, 771, 787.
Handbook of Chemistry and Physics, 57th Edition, 1976–1977, pp. F-213,214.
Amphlett et al, "Hydrous Zirconium Oxide and Other Oxides", *J. Inorg. Nucl. Chem.*, 1958, vol. 6, pp. 236–245.
Vesely et al, "Hydrous Oxides and Acidic Salts of Multivalent Metals", *Talanta*, 1972, vol. 19, pp. 219–262.

*Primary Examiner*—John F. Terapane
*Assistant Examiner*—Virginia B. Caress
*Attorney, Agent, or Firm*—Fleit, Jacobson, Cohn & Price

[57] ABSTRACT

A composition comprising a support such as a porous silicate glass or silica gel or charcoal having interconnected pores and containing heavy metal cations of mercury, thallium, silver, platinum, palladium, lead or copper capable of forming a stable complex with an anion bonded to the support. The preferred heavy metal cation is a mercury cation. The composition is especially useful for removing radioactive iodine from liquid and gaseous waste streams.

14 Claims, No Drawings

FIXATION OF ANIONIC MATERIALS WITH A COMPLEXING AGENT

CROSS-REFERENCE TO RELATED APPLICATION

This application is a continuation-in-part of U.S. Ser. No. 408,162, filed Aug. 16, 1982, now abandoned.

BACKGROUND OF THE INVENTION

This invention relates to the fixation of anionic materials, e.g., radioactive anionic species, with a complexing agent immobilized on a support such as a silicate glass or silica gel or charcoal matrix.

A number of radioactive isotopes are present in the cooling, operational and waste water from the daily operation of nuclear power plants and fuel rod holding tanks. While these radioactive isotopes are present in the water in very low concentrations, they are nonetheless highly radioactive and toxic to human life. Safe disposal or re-use of the contaminated water can only be conducted if a sufficient quantity of radioactive isotopes is removed to reach permissible levels.

The radioactive isotopes present in contaminated nuclear reactor water include cations and anions. The removal of radioactive cations using a porous glass cation exchanger is disclosed in co-pendinq application Ser. No. 370,437 filed Apr. 21, 1982, now U.S. Pat. No. 4,469,628, which is a continuing application of Ser. No. 39,595 filed May 16, 1979, now abandoned, which is a continuing application of Ser. No. 959,222, filed Nov. 9, 1978, now abandoned, each by Simmons, Simmons, Macedo and Litovitz and each entitled "Fixation By Ion Exchange of Toxic Materials In A Glass Matrix".

The anions present in solution consist primarily of $I^{131}$ which has a half-life of 8 days but which possesses a significant threat to life due to its affinity for and high reconcentration in animal and human metabolic processes. After three months, the majority of the nonmetal anions have generally decayed to stable isotopes; however, many of the longer-lived metal isotopes form anionic complexes such as chromates, cerates, and molybdates, which remain radioactive for longer time periods.

Radioactive isotopes also are formed in the vapors given off by various processes in the nuclear fuel cycle. Thus, there also exists a need in the art for cleaning these vapors.

Organic anion resins are typically used for decontaminating water used in nuclear reactors. However, they are readily decomposed by radioactivity, they cannot be dried, they are not readily compatible for use in mixed beds with the new types of glass cation exchangers coming on the market, and they cannot be put into a long-term chemically stable form, thus causing a serious danger to the environment through premature release of the radioactive isotopes.

U.S. Pat. No. 4,333,847 by Tran, Macedo, Simmons, Simmons and Lagakos entitled "Fixation By Anion Exchange of Toxic Materials In A Glass Matrix" discloses the use of a porous glass medium as an anion exchanger. The glass anion exchanger of the Tran et al patent, the disclosure of which is expressly incorporated herein by reference, is a porous silica glass or gel containing silica having interconnected pores. Non-radioactive cationic polyvalent metals such as zirconium or lead can be bonded to silicon of the glass or gel through divalent oxygen linkages on the internal surfaces of the pores. Non-radioactive anions such as hydroxyl groups are ionically bonded to the cationic metals and displaceable by the radioactive anions to provide a distribution of radioactive anions internally bonded within the pores of the glass or gel.

In an article by Amphlett et al, entitled "Synthetic Inorganic Ion-Exchange Materials—II. Hydrous Zirconium Oxide and Other Oxides," *J. Inorg. Nucl. Chem.*, Vol. 6, pp. 236 to 245 (1958), hydrous oxides, such as hydrous zirconium oxide, are disclosed as anion exchangers in acid and neutral solution and as cation exchangers in alkaline solution. However, there is no teaching or suggestion in the Amphlett et al article of binding the hydrous metal oxide to the silicon atoms of a porous glass or a porous silica gel through divalent oxygen linkages and reacting the resulting product with radioactive or toxic anions.

British Patent Specification No. 1,363,491 by Wilhelm et al entitled "Recovery of Iodine and Iodine Compounds" discloses a sorbing material for the removal of molecular iodine and/or organic iodine compounds which have up to six carbon atoms from gases and/or vapors. The sorption agent comprises "amorphous silicic acid" impregnated with a metal salt such as silver nitrate. Thus, this patent specification also discloses other prior art processes for the removal of iodine.

As discussed in co-pending application Ser. No. 370,437, the disclosure of which is expressly incorporated herein by reference, water bodies have been contaminated in the past with mercury, cadmium, thallium, lead and other heavy metal cations. The concentration of the cations in the waste streams is very low thus presenting the problem of treating large volumes of water containing small amounts of toxic cations. These waste streams can be purified by ion-exchanging the poisonous cations into a porous glass or silica gel. The porous glass or silica gel contains at least 75 mol percent silica and has interconnected pores. Non-radioactive alkali metal cations, Group I(b) metal cations, or ammonium cations are bonded to silicon of the glass or gel through divalent oxygen linkages on the internal surfaces of the pores. The non-radioactive cations are displaceable by the heavy metal cations to provide a distribution of the heavy metal cations internally bonded within the pores of the glass or gel.

British Pat. No. 1,389,905 describes a process for the preparation of radioactive molybdenum-99 which comprises: (1) irradiating a uranium material to produce nuclear fission therein; (2) dissolving the irradiated uranium material in an aqueous inorganic acid to form a solution; (3) precipitating molybdenum-99 by contacting the resultant acid solution with alpha-benzoinoxime; (4) recovering and dissolving the molybdenum precipitate in an aqueous alkaline solution; (5) contacting the alkaline solution containing the molybdenum-99 with at least one adsorbent for the selective removal of impurities, the adsorbent being (i) silver-coated charcoal, (ii) an inorganic ion adsorbent or (iii) activated carbon; (6) thereafter recovering radioactive molybdenum-99. This patent also describes a process for the preparation of a highly pure radioactive molybdenum-99 having a high specific activity which comprises: (1) irradiating uranium oxide to produce nuclear fission therein, the uranium oxide being deposited on the inner walls of a sealed stainless steel cylindrical target, (2) dissolving the irradiated uranium oxide in an aqueous mixture of sulfuric and nitric acids to form a solution, (3) adding to the resultant acid solution a stabilizing amount of sodium sulfite and hold-back carrier amounts of ruthenium chloride and/or sodium iodide, (4) precipitating molybdenum-99 by contacting the stabilized solution with alpha-benzoinoxime, (5) recovering the precipitated molybdenum by dissolving in an aqueous sodium hydroxide solution, (6) contacting the resultant alkaline solution with silver-coated charcoal, (7) acidifying the resultant alkaline solution, adding an oxidizing agent and repeating steps (4) and (5), (8) contacting the sodium hydroxide solution with silver-coated charcoal and zirconium oxide, (9) contacting the sodium hydroxide solution with activated charcoal, and (10) recovering molybdenum-99. In this process, the adsorbents (inorganic ion exchangers such as zirconium oxide, charcoal coated with metallic silver, activated carbon) are used to remove impurities such as iodine and ruthenium from the molybdenum-containing solution, which is made strongly alkaline with potassium hydroxide. The decontamination of near-neutral solutions such as reactor coolant or effluent streams is not discussed.

SUMMARY OF THE INVENTION

The present invention relates to a composition in which a complexing group is immobilized by attachment to a support. As used herein, "complexing agent" or "complexing group" means an atom, molecule, ion or chemical group which, upon being bonded, attached, sorbed or physically located at or close to a solid surface or a porous structure or support can cause a significant enhancement in the tendency of a dissolved ionic or neutral species to adhere to this surface or to become attached or occluded inside the porous solid. The mechanism through which this effect is achieved may consist of the formation of a coordinate covalent complex species, an insoluble or scarcely soluble compound, or a non-dissociated or weakly dissociated covalent or ionic species.

The complexing group of the present invention is formed from a heavy metal, i.e., mercury, thallium, silver, platinum, palladium, lead or copper. The mercury species can be in the mercurous ($HG_2^{+2}$) state or the mercuric ($Hg^{+2}$) state. The thallium is preferably in the trivalent state when used as a complexing group.

The support in accordance with one aspect of the invention is preferably a porous silica glass or silica gel containing silicon dioxide ($SiO_2$) as a major component, having a large surface area and having large amounts of silicon-bonded hydroxyl groups on the surfaces. The $SiO_2$ content of the porous glass or silica gel desirably is at least about 70 mol % $SiO_2$. The support in accordance with another aspect of the invention is preferably charcoal prepared by the destructive distillation of wood such as nut shells (e.g., coconut shells). The support is modified with complexing groups (e.g., mercury) so that anions such as radioactive iodine are bonded to the surface by being complexed by the complexing groups.

The present invention provides an improvement over prior art anion exchangers. With respect to organic anion exchangers currently in use, the invention has all the advantages associated with the use of a porous glass or charcoal material as the anion exchanger rather than an organic material. The glass or charcoal anion exchanger is insensitive to radiation including the short-lived isotopes it is designed to remove from contaminated waters and it can be dried thus reducing the dissemination of radioactive isotopes after use.

The present invention also provides an improvement over some organic anion exchangers in cases in which the waste waters are loaded with borate. The borate will quickly be taken up by the anion exchange resin, causing it to have a limited capacity. By contrast, the present invention provides an anion exchanger through which iodide (or other selected anions) can be preferentially absorbed in the presence of a large excess of other anions including borate.

The present invention also provides an improvement over prior art anion exchangers in cases in which the waste streams contain relatively large amounts of non-radioactive chloride in the presence of radioactive iodide. More particularly, the present invention provides a means of selectively sorbing iodide at a much higher efficiency than chloride.

The present invention also provides an improvement over other forms of anion exchangers, particularly with respect to increased capacity. Mercury is about 10 to 12 orders of magnitude better on a porous silicate glass or silica gel support for complexing with iodide than lead and also probably zirconium, two of the hydrous polyvalent metal species disclosed in U.S. Pat. No. 4,333,847. In particular, mercury in the presence of ammonia is a very effective sorbing agent for iodide and is preferred.

The present invention also provides an anion exchanger in which the effective capacity of the exchanger is extremely large relative to the half-life of short-lived radio-isotopes such as $I^{131}$. Thus, the effective capacity of the anion exchanger of the present invention is limited only by the dissolution of the exchanger. This is in sharp contrast to conventional anion exchangers in which the effectiveness of the exchanger is limited by the number of unoccupied sites available for sorption of the desired long-lived ions.

The present invention relates not only to the porous glass or other exchanger containing bonded cationic complexing groups (i.e., mercury or thallium) which are capable of forming a stable complex with a predetermined anion (e.g., a halide), but also to the process of removing anions from waste water by means of such glass or other exchanger, and to the resultant complex. The invention can make use of porous glass materials containing cations, which previously would have been considered suitable only for subjection to heat treatment to collapse the pores in the glass and subsequent disposable as immobilized waste.

The present invention also relates to a process of removing radioactive vapors such as iodine from off gases from various processes in the nuclear fuel cycle.

DESCRIPTION OF THE PREFERRED EMBODIMENTS

The process and composition according to this invention serve to absorb anions by forming stable complexes with a mercury, thallium, silver, platinum, palladium, lead or copper complexing group immobilized by attachment to a support. The mercuric ion ($Hg^{+2}$) is the most preferred complexing cation, at least for iodide ion. The mercuric ion is a divalent cation forming a highly stable iodide complex (log $K_1=13.4$, according to G. Sillen, *Stability Constants*). The mercuric ion exhibits high stability in uncomplexed form in oxidizing and mildly reducing media and is not as expensive as the mercurous ($Hg_2^{+2}$) or thallium cations.

The support in accordance with one aspect of the invention is preferably a porous silicate glass or silica gel. Suitable glass compositions which may be utilized generally contain silicon dioxide ($SiO_2$) as a major component, have a large surface area and have large amounts of silicon-bonded hydroxyl groups on the surface. The $SiO_2$ content of the porous glass or silica gel desirably is at least about 70 mol percent $SiO_2$, preferably at least about 82 mol percent $SiO_2$, and most preferably at least about 89 mol percent $SiO_2$ on a dry basis. Such glasses are described in the literature, see U.S. Pat. Nos. 2,106,744; 2,215,936; 2,221,709; 2,272,342; 2,326,059; 2,336,227; 2,340,013; 4,110,093; and 4,110,096, for example. The disclosures of the last two mentioned patents are incorporated herein by reference.

The porous silicate glass compositions can also be prepared in the manner described in U.S. Pat. No. 3,147,225 by forming silicate glass frit particles, dropping them through a radiant heating zone wherein they become fluid while free falling and assume a generally spherical shape due to surface tension forces and thereafter cooling them to retain their glassy nature and spherical shape.

In general, the porous silicate glass can be made by melting an alkali metal borosilicate glass, phase-separating it into two interconnected glass phases and leaching one of the phases, i.e., the boron oxide and alkali metal oxide phase, to leave behind a porous skeleton comprised mainly of the remaining high silicate glass phase. The principal property of the porous glass is that when formed it contains a large inner surface area covered by silicon-bonded hydroxyl groups. It was found preferable to use porous glass made by phase-separation and leaching because it can be made with a high surface area per unit volume and has small pore sizes to give a high concentration of silicon-bonded hydroxyl surface groups, and because the process of leaching to form the pores leaves residues of hydrolyzed silica groups in the surface groups present. The porous silicate glass may be in the shape of a suitable geometric or non-geometric container such as a cylinder, or it may be in particulate form such as powder, beads, spheroids, etc., desirably contained in a suitable container or conforming to the shape of the container such as a column, nylon bag, cube, plate-like membrane, cylinder, sphere, etc., and thereafter (or prior thereto) ion-exchanged so that the protons of the silicon-bonded hydroxyl groups are replaced with alkali metal, Group Ib metal and/or ammonium cations.

The literature also adequately describes the preparation of silica gel compositions which can be employed in this invention. These materials are available, for example, as LUDOX silica gel, sold by E. I. DuPont de Nemours & Co., which contains 0.08 to 0.6 wt. percent $Na_2O$ as titrable alkali believed to be present as silicon-bonded NaO-groups.

Another class of materials which can be employed in this invention includes polymerized or partially polymerized systems prepared by means of processes associated with the sol-gel technique and consisting of single-component (in particular, high-silica) or multi-component (e.g., $Na_2O$-$B_2O_3$-$SiO_2$, $SiO_2$-$TiO_2$) compositions (Yoldas, J. Mater. Sci., 14, 1843 (1979); Yoldas, J. Non-cryst. solids 38, 81 (1980); Mukherjee, in Materials Processing in the Reduced Gravity Environment of Space, Elsevier, 1982).

Aluminosilicates containing cations which can undergo ion-exchange processes, such as zeolites, can also be used in this invention. A zeolite is *defined* as "belonging to the zeolite family of minerals and synthetic compounds characterized by an aluminosilicate tetrahedral framework, ion-exchangeable large cations, and loosely held water molecules permitting reversible dehydration. The general formula can be written $X^{1+,2+}{}_yAl^{3+}{}_xSi^{4+}{}_{1-x}O_2 \cdot nH_2O$. X is a large cation, typically an alkali or an alkaline earth." (McGraw-Hill Encyclopedia of Science and Technology, McGraw-Hill, Inc., New York, N.Y., 1977, Vol. 14, p.696).

The protons of the silicon-bonded hydroxyl groups of the support are ion exchanged for an alkali metal, a Group Ib metal and/or an ammonium cation, in a solution containing a suitable hydroxide, e.g., sodium hydroxide, rubidium hydroxide, cupric hydroxide, cuprous hydroxide, ammonium hydroxide and/or a salt of any of these metals which is capable of exchanging the corresponding cation for the protons of the silicon-bonded hydroxyl groups, such as a nitrate, a sulfate, an acetate, a bromide, a phosphate, a chloride and the like including silver nitrate, gold nitrate and the like. As indicated hereinabove, suitable non-radioactive metal cations for exchange with the protons of silicon-bonded hydroxyl groups, i.e., for attachment to silicon through divalent oxygen, include sodium, potassium, cesium, rubidium, lithium, copper (cupric and/or cuprous), silver, gold, and ammonium.

It is preferred to react the porous support containing silicon-bonded hydroxyl groups with the appropriate salt of the non-radioactive alkali metal, Group Ib metal and/or ammonium cation at a sufficiently high pH to bring about the exchange of the metal or ammonium cation of the salt with the proton of the silicon-bonded hydroxyl groups, but not so high that substantial amounts of the support dissolve or begin to dissolve. There is a loss of surface area associated with this dissolution of the porous support at excessively high pH's and thus a loss of silicon-bonded hydroxyl groups and/or silicon-bonded non-radioactive metal or ammonium cation oxy groups. A preferred method of exchanging the protons of silicon-bonded hydroxyl groups is to treat the porous support with a salt of the alkali metal, and/or Group Ib metal buffered with ammonium hydroxide or otherwise buffered at a pH of about 11 to 13. It has been found that the buffering with ammonium hydroxide of the primary ion exchange of said non-radioactive metals for the protons of the silicon-bonded hydroxy groups in this manner avoids significant loss of support or surface area.

The substantially anhydrous support can contain about 0.1 mol percent to about 15 mol percent, desirably more than about 0.5 mol percent of non-radioactive metal or ammonium cation oxy groups, i.e., alkali metal, Group Ib metal and/or ammonium cation oxy groups. The surface to weight ratio for the said substantially anhydrous support is at least about 0.1 m²/g to at least several thousand m²/g, e.g., 10,000 m²/g, preferably at least upwards of 10 m²/g. A suitable surface to weight ratio of the said support can range from about 5 to about 500 m²/g.

The support is then treated to form and immobilize the complexing groups. The porous intermediate cation exchange support is contacted with mercury or thallium metal dissolved in an aqueous medium having a pH from about 5 to 7.5. During the contact, the heavy metal is bonded to silicon atoms of the support through divalent oxygen linkages to anchor or bond the mercury or thallium to the support.

While we do not intend to be bound by this description, we believe that the porous glass into which mercuric ions have been introduced by ion exchange is characterized by the following complexing groups:

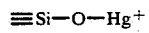

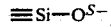
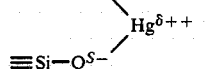

In the case that part of the mercury is incorporated in the mercurous form, analogous structures such as ≡Si—O—Hg—Hg$^+$ may be present. In the case ammonia is present, the porous glass into which mercuric ions have been introduced by ion exchange is characterized by the following complexing groups:

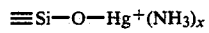

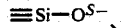
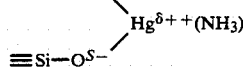

It should be understood that some or all of the mercury groups can be bonded through oxy groups to boron of the silica glass. After complexing with anions, therefore, some or all of the anions may be attached to a boron site of the glass through the above-mentioned complexing groups. In some cases, a large proportion of the mercury and/or thallium may simply be deposited within the pores of the silica glass or gel with little, if any, bonding of the mercury or thallium by oxy linkages to silicon of the glass or gel. However, it is believed that at least some of the mercury or thallium atoms are joined to silicon by oxy linkages such as described above in most cases.

The effectiveness of the mercury sites in sorbing anions and their selectivity in picking up one anion relative to another are likely to be dependent on the exact nature of the site, which in turn is a function of the nature of the sorbing material, the techniques used to convert it to the mercury form and the chemical environment during the exchange processes. For instance, the presence of ammonia during the preparation and the sorption stages tends to enhance the effectiveness of the selective removal of iodide from solutions containing a variety of anions.

The proportion of complexing groups bonded to silicon of the support through oxy groups can be regulated by several techniques. Of course, the proportion of silicon-bonded hydroxyl groups in the support will determine generally the maximum amount of silicon-bonded complexing groups obtainable. Longer times of contact of the heavy metals with the support will increase the proportion of silicon-bonded complexing groups. Also, the smaller the particle size of support, the greater the proportion of the complexing groups that will be bonded within a given time. Any other suitable technique such as varing the concentration can be used to regulate the proportion of complexing groups bonded to silicon of the porous support.

The support in accordance with another aspect of the invention is preferably charcoal. Suitable complexing groups include not only mercury and thallium but also silver, platinum, palladium, lead and copper. Charcoal is a form of amorphous carbon and is obtained from the destructive distillation of wood, sugar, coal and other carbonaceous materials. The term "charcoal" is intended to include the so-called activated carbons which are produced by gas or chemical treatment to create a very large surface area. Specifically, activated carbon has a large specific area and is designed for absorption from the gas and liquid states. The specific area of activated carbon can range from about 500 to 2,000 m$^2$/g, more typically about 800 to 1500 m$^2$/g. Activated granular and powdered carbon includes a pore structure created by the steps of driving off constituents from the carbonaceous raw materials and partially oxidizing the residue. The oxidation typically is conducted by means of steam, flue gas, air or carbon dioxide. The charcoal used in accordance with the invention is preferably produced from wood such as coconut or other nut shells. Suitable charcoal is available from Fisher Scientific Company, Pittsburgh, Pa. and Barnebey-Cheney, Columbus, Ohio.

The charcoal support is treated to form and immobilize the complexing groups. The porous charcoal support is contacted with the complexing group dissolved in an aqueous medium. During the contact, the heavy metal is bonded to the charcoal support to anchor or bond the mercury, thallium, silver, lead, copper, platinum, palladium, lead or copper to the support.

It is believed that at least some of the complexing atoms are joined to carbon of the charcoal support. However, in some cases, a large proportion of the mercury and/or thallium or the like may simply be deposited within the pores of the charcoal with little, if any, chemical bonding of the complexing atoms to the support.

The proportion of complexing groups bonded to the charcoal support can be controlled through the contact time of the heavy metals with the support. Longer contact times will increase the proportion of bonded complexing groups. A greater proportion of complexing groups will be bonded within a given time the smaller the particles size of the support. Any other suitable technique such as varying the concentration can be used to regulate the proportion of complexing groups bonded to the charcoal support.

The amount of complexing groups (e.g., mercury or thallium) immobilized on the support is generally at least about 0.001% by dry weight, preferably at least about 0.01%, and most preferably at least about 0.1%. Generally, the support will have at most about 50% by dry weight, preferably at most about 10% by dry weight, of complexing groups (e.g., mercury or thallium) immobilized thereon.

The support having the complexing groups immobilized thereon is then contacted with the waste stream containing the anionic material such as iodine or chloride. The waste stream can be any of the various waste streams identified in U.S. Pat. No. 4,333,847. This contact can take place in a packed anion exchange or mixed bed column. Dilute solutions having less than 0.001 microcurie radioactivity per milliliter as well as more concentrated solutions, e.g., those having as high as 1 microcurie or more radioactivity per milliliter, can be treated by this invention.

When using an anion exchange column, it is preferred that the porous silicate glass or other support be finely divided to a suitable size to maximize the contact of the waste stream with the particles of the silicate glass or other support. The waste stream is passed through the column and the anions in solution are complexed with the complexing groups in the porous glass or other support to chemically complex the anions to the support.

While we do not intend to be bound by the following, we believe that I⁻ complexes with mercury on a porous silicate glass or silica gel in the following manner:

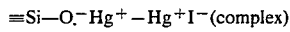

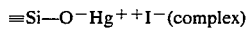

As discussed above, the iodine may also complex with mercury attached to boron sites.

We have found that particularly good results can often be obtained by using a combination of a layer of mercury-treated porous silicate glass or silica gel and a layer of charcoal in removing iodide from certain reactor streams. Specifically very low iodide levels (e.g., about $5 \times 10^{-12}$ gram per liter of $^{131}$I and up to $5 \times 10^{-8}$ gram per liter of total iodide) are very difficult to treat, probably due to the existence of other chemical species of iodine in addition to iodide which are less amenable to sorption on glass. However, even these reactor streams can surprisingly be effectively treated using mercury-treated porous silicate glass or silica gel in combination with charcoal. Without being bound by any particular theory, it is believed that these good results are obtained because of the activation of the charcoal with mercury desorbed from the mercury-treated porous silicate glass or silica gel.

Accordingly, it is within the scope of the present invention to use a combination of mercury-treated porous silicate glass or silica gel and charcoal for maximum sorption and removal of iodide species. Alternatively, it is within the scope of the present invention to use a mercury-treated porous silicate glass or silica gel or other source which provides a slow, continuous release of mercury or other complexing group (i.e., thallium, silver, platinum, palladium, lead or copper) for continuous activation of a charcoal bed.

It is further within the scope of the present invention to use various configurations of the glass/charcoal combination such as two separate zones, multiple alternating layers of mercury-treated porous silicate glass or silica gel and charcoal or a mixed bed of mercury-treated porous silicate glass or silica gel and charcoal.

It has been observed that one unit volume of glass or gel or charcoal or other support can "concentrate" the radioactive anionic species contained in several thousand unit volumes of waste water on a calculated basis. The term "column volume" (CV) is often used in this context and means one volume of liquid (water) per one volume of glass or gel or charcoal or other support.

EXAMPLE 1

This example demonstrates the sorption of iodide on a mercury-treated, previously sodium-exchanged, porous glass ion-exchanger.

A borosilicate glass containing 4 mol percent Na₂O, 4 mol percent K₂O, 35 mol percent B₂O₃ and 57 mol percent SiO₂ and shaped in the form of rods (length-12"; diameter-0.3") was heat-treated in Vycor tubes for 110 minutes at 550° C. The rods were subsequently ground and sieved to separate out the −45 +25 mesh fraction. A volume of ground glass was leached with 3N HCl for 1 day and washed with de-ionized water to remove the HCl. The resulting highly porous glass powder which has undergone the process detailed above is designated Glass U. This glass was found to contain 0.070 percent Na based on the dry weight of the glass.

A volume of 100 ml of Glass U was stirred with 400 ml of an aqueous solution containing both 3.7M ammonia and 3.2M NaNO₃ for 2 days, then with 400 ml of aqueous 3.2M NaNO₃ for 1 day, then 6 times with de-ionized water, then with 3.2M NaNO₃. The wet glass contained 43 percent water, and upon analysis was found to contain 3.68 percent Na and 0.014 percent NH₃ based on the dry weight of the glass. This glass powder is henceforward designated Glass C.

A column loaded with 5.84 ml of Glass C was initially washed with 25 ml of de-ionized water. The following 4 stages of treatment were carried out in order to activate the column for iodide absorption and to measure its performance with respect to iodide removal:
(i) Passage of 1800 ml of a solution of approximately 50 ppm Na (introduced as NaOH) and 500 ppm of B (introduced as H₃BO₃), lowering the pH from an initial value of 9.8 to 6.6.
(ii) Treatment with 800 ml of a solution of approximately 50 ppm Na, 500 ppm B and 250 ppm Hg (introduced as HgCl₂) to load the column with mercury.
(iii) Washing the 900 ml of a solution of approximately 73 ppm Na (introduced partly as NaOH and partly as NaNO₃) and 500 ppm B to displace excess mercury from the liquid phase.
(iv) Testing with 300 ml of a solution of approximately 75 ppm Na, 500 ppm B and 10 ppm I⁻ (introduced as NaI).

The flow rate through the column throughout the experiment was 13.4 ml/min, corresponding to a residence time of 26 seconds.

40 column volumes of mercury, corresponding to 0.035 mMole/ml, were absorbed on the column during stage (ii) and 30 column volumes or 0.026 mMole/ml were desorbed during stages (iii) and (iv), thereby leaving a final concentration of Hg on the column of 0.009 mMole/ml.

435 column volumes or 0.040 mMole/ml of iodide were absorbed on the column. The decontamination factor (i.e., the ratio between the concentrations of iodide in the influent and in the effluent, respectively) throughout the first 180 column volumes of stage (iv) was at least 180. The decontamination factor was equal to 2 after 375 column volumes.

The concentrations of Na and B were also monitored througout this run without showing any significant retention.

EXAMPLE 2

This example shows that when the solutions used during treatment and testing of the glass contain NH₄⁺ the glass has a higher capacity with respect to iodide sorption.

A volume of 100 ml of Glass U (see Example 1) was contacted with 400 ml of 3.7M ammonia. The wet glass contained 44 percent water, and upon analysis was found to contain 0.57 percent NH₃ and 0.049 percent Na based on the dry weight of the glass. This glass powder is henceforward designated Glass A.

A column prepared with Glass A was treated during stage (i) with 1300 ml of a solution containing 74 ppm NH₃ (introduced as NH₄OH) and 500 ppm B (introduced as H₃BO₃), lowering the pH to 6.7. The column was loaded with mercury during stage (ii) by means of passing through it 600 ml of a solution containing 24 ppm NH₃ (introduced partly as NH₄OH and partly as NH₄NO₃), 500 ppm B and 250 ppm Hg (introduced as HgCl₂). The column was washed during stage (iii) using a solution containing 24 ppm NH₃ and 500 ppm B. Finally, the performance of the column with respect to iodide sorption was measured during stage (iv) using 10400 ml of a solution containing 24 ppm NH₃, 500 ppm B, 10 ppm I⁻ and 1.8 ppm Na (the latter two as NaI). The flow rate was 11 ml/min, corresponding to a residence time of 32 seconds.

The capacity with respect to iodide sorption was found in this case to be 1650 column volumes, corresponding to 0.140 mMole/ml of iodide adsorbed on the column. The amount of mercury absorbed during state (ii) in this case, 58 column volumes or 0.075 mMole/ml, was not very much larger than the amount absorbed in the of sodium-treated glass (0.035 mMole/ml, see Example 1), but it was desorbed to a much lesser extent (i.e., 10% compared to 70–80% in the case of sodium-treated glasses) during stage (iii) and the beginning of stage (iv), thereby leaving 0.066 mMole/ml Hg adsorbed on the column. The final ratio between the concentrations of iodide and of mercury, respectively, on the column was 2 to 1. It was also observed that when Na⁺ containing solution began to pass through the column during stage (iv), sodium absorption occurred only during the first 30 column volumes of this stage and the extent of adsorption was 0.0008 mMole/ml.

The decontamination factor for iodide in this experiment was above 760 during the first 1060 column volumes of stage (iv) and above 310 during the entire first 1300 column volumes.

EXAMPLE 3

This example shows that the concentration of borate does not have a significant effect on the process of iodide sorption.

A column prepared with a glass similar to Glass C and having 3.70 percent Na and 0.059 percent NH₃ based on the dry weight of the glass was treated with the same volumes and compositions of solutions as those detailed in stages (i), (ii) and (iii) of Example 1. During stage (iv) the testing solution contained approximately 50 ppm Na and 10 ppm iodide, but only 50 ppm B compared with 500 ppm B in Examples 1 and 2. A volume of 2800 ml of this solution was used during stage (iv) in the present case. The flow rate was 9 ml/min., corresponding to a residence time of 39 seconds.

The capacity with respect to iodide sorption was found in this case to be 480 column volumes, very little more than in Example 1. The decontamination factor for iodide was at least 1150 during the first 240 column volumes of stage (iv), the onset of the breakthrough having occurred at a volume very similar to the one observed in Example 1.

EXAMPLE 4

This example shows that without loading with mercury (or other cationic complexing group) the glass does not have a significant capacity for iodide sorption.

A column prepared with Glass A (see Example 2) was treated with the same volume (1800 ml) and the same solution (approximately 50 ppm Na and 500 ppm B) as in Example 1, lowering the pH to 6.8. Then it was tested with 600 ml of a solution similar to the one used in Example 1, i.e., 75 ppm Na, 500 ppm B, and 10 ppm iodide. The flow rate was 9 ml/min., corresponding to a residence time of 39 seconds. The apparent capacity of the column was only 5 column volumes, corresponding to 0.0004 mMole/ml. It was also noted that 0.121 mMole/ml of Na were adsorbed on the column during the initial treatment (stage (i)) of the initially ammonium-loaded glass.

EXAMPLE 5

This example shows that molecular iodine can be effectively sorbed on mercury-treated porous glass.

A short borosilicate glass buret with a cross section of 0.942 cm² was loaded with 3.30 ml of Glass C (see Example 1). A stream of pure nitrogen was saturated with water vapor by passing it through a trap containing liquid water in order to prevent drying of the column. The nitrogen stream was next passed through a trap which contained at its bottom 2 grams of iodine crystals heated to 48° C. The nitrogen stream could then be directed either through the glass column or through a by-pass tube. The nitrogen stream from either route was then passed through a trap containing 50 ml of an aqueous solution prepared by dissolving 1 g of 4,4',4''-methylidenetris-(N,N'-dimethylaniline) in water, adding 12 ml of concentrated HClO₄, 20 ml of saturated HgCl₃ solution, and diluting to 1000 ml with de-ionized water. This solution is an effective absorbing medium for iodine and becomes bluish-green in color in the presence of iodine. The intensity of the bluish-green coloration (628 nm) is proportional to the concentration of iodine.

The flow rate of the gas stream through the column throughout the experiment was 133 ml/min., corresponding to a residence time of 1.5 seconds.

Upon passing the wet iodine-containing nitrogen through the column, the column turned black-violet and then rose-colored. The concentration of iodine in the effluent was at first very low, but when the entire column became colored increasing concentrations of iodine began to accumulate in the trap. An excellent agreement was obtained between the iodine concentration in the effluent after the column became completely saturated (after the passage of 3640 column volumes), which corresponded to a concentration of 1.10 ppm in the gas stream, and the concentration which was measured in the influent gas stream using the by-pass line. The latter concentration was 1.12 ppm.

The capacity of the glass for iodine absorption was 2700 column volumes, corresponding to 0.012 mMole/ml of iodine (I₂) adsorbed on the column. In terms of atomic iodine (I) the capacity is 0.024mMole/ml, similar to the capacities for iodide absorption observed in previous examples. This indicates that a large fraction of the iodine is probably sorbed on the glass column in the iodide form.

The decontamination factor for iodine is at least 124 throughout the first 1210 column volumes and at least 57 throughout the first 1820 column volumes.

EXAMPLE 6

This example demonstrates the sorption of chloride on a mercury-treated, previously sodium-exchanged, porous glass ion-exchanger.

A column prepared with Glass C (see Example 1) was loaded as described in Example 1. The following four stages of treatment were carried out in order to activate the column for chloride sorption and to measure its performance with respect to chloride removal:

(i) Passage of 900 ml of a solution of approximately 50 ppm Na (introduced as NaOH) and 500 ppm of B (introduced as $H_3BO_3$), lowering the pH from an initial value of 9.0 to 7.1.

(ii) Treatment with 600 ml of a solution of approximately 28 ppm Na (introduced partly as $NaNO_3$ and partly as NaOH), 500 ppm B, and 250 ppm Hg (introduced as $Hg(NO_3)_2$) to load the column with mercury.

(iii) Washing with 200 ml of a solution of approximately 28 ppm Na and 500 ppm B to displace excess mercury from the liquid phase.

(iv) Testing with 2000 ml of a solution of approximately 35 ppm Na, 500 ppm B, and 10 ppm $Cl^-$ (introduced as NaCl).

The flow rate through the column throughout the experiment was 39 ml/min, corresponding to a residence time of 39 seconds.

The capacity with respect to chloride sorption was found in this case to be 80 column volumes, compared with approximately 400 column volumes in Examples 1 and 3 where the capacity for iodide sorption was determined under similar conditions. However, expressed in molar terms, the resulting column capacity is 0.022 mMole/ml, almost exactly the same as the iodide capacity obtained in Examples 1, 3 and 5. [This indicates that the total capacity of the glass for any halide depends only on mercury loading, while a more gradual shape of the breakthrough curve in the case of chloride (the decontamination factor falls below 10 soon after 20 column volumes have passed through) is indicative of a weaker mercury-halide bonding in the case of chloride than in the case of iodide.]

EXAMPLE 7

This example demonstrates that a porous glass ion-exchanger can be used to purify radioactively contaminated water and that in cases where the time required for a radioactive ion to pass through the column is long compared with its half-life the ion-exchanger does not exhibit a breakthrough. The decontamination factor remains unchanged or continues to improve even when a very large number of column volumes of contaminated water have passed through the column.

A system consisting of two porous glass ion-exchanger columns arranged in series was set up. These consisted of two PYREX glass columns, each with a cross section of 0.28 cm$^2$, which were connected in series between an influent reservoir and an effluent tank using polyvinylchloride and stainless steel tubing and fittings. A positive-displacement stainless steel pump was used to draw the solution through the columns. The direction of flow through each column was from top to bottom.

Two types of glass were prepared: a Na-exchanged glass similar to Glass C (see Example 1) and an Hg-exchanged glass obtained by subjecting the former glass to a process similar to stages (i), (ii) and (iii) in Example 1. However, in the present case the solution used during stage (ii) contained a higher concentration of mercury in order to ensure maximum mercury loading of the glass. In more detail, the solution used during stage (i) in the present case contained 150 ppm Na (introduced as NaOH) and 300 ppm B (introduced as $H_3BO_3$); the solution used during stage (ii) contained 7500 ppm Hg (introduced as $HgCl_2$), 60 ppm Na and 600 ppm B; and the solution used during stage (iii) contained 150 ppm Na and 350 ppm B. Each of the two glass powders was placed in a container with de-ionized water, and each of the two columns was loaded with a volume of 0.6 ml (a height of 2.1 cm) of Na-exchanged glass (a cation exchanger for sorbing Cs and ionic cobalt) and, on top of it, a volume of 0.4 ml (a height of 1.5 cm) of Hg-exchanged glass (an anion exchanger for sorbing I). Accordingly, the full volume of each column was 1.0 ml. The glass powders were placed between fritted stainless steel discs which were held in place by means of flexible stainless steel rings.

The columns were back-washed with 500 ml of de-ionized water. Next, the testing solutions were passed through the columns. The first test solution consisted of 3000 ml of waste-water sampled at the Virginia Electric & Power Co. Surry Nuclear Power Plant at Gravel Neck, Va. Analyzed constituents of this water included 34 mg/l Na, 300 mg/l B, and 6.5 mg/l Ca and the pH was 8. The total content of radioactive species was $6.375 \times 10^{-3}$ μCi/ml, including $5.40 \times 10^{-3}$ μCi/ml of $H^3$ and $9.75 \times 10^{-4}$ μCi/ml of other radio-isotopes. Two of the most important radio-isotopes were $I^{131}$ ($5.745 \times 10^{-4}$ μCi/ml) and $Cs^{137}$ ($3.522 \times 10^{-4}$ μCi/ml). Other identified radioactive species present included $Co^{60}$ ($5.219 \times 10^{-4}$ μCi/ml), $Cs^{134}$ ($2.328 \times 10^{-4}$ μCi/ml), $Co^{58}$ ($1.718 \times 10^{-4}$ μCi/ml) and $Mn^{54}$ ($1.753 \times 10^{-5}$ μCi/ml). The concentration of non-radioactive iodine is approximately four times larger than the concentration of $I^{131}$, based on fission reaction product yields. (No data are available concerning the possiblity of further traces of non-radioactive iodine entering the water from other sources.) Since only a volume of 3000 ml of this reactor waste-water was available at the time of the experiment, an additional volume of 3000 ml of synthetic solution containing 1300 mg/l Na, 300 mg/l B, 14 mg/l Ca, 60 mg/l $Cl^-$ and $5.6 \times 10^{-4}$ μCi/ml $I^{131}$ was prepared. This solution, which was passed through the column after all the original reactor waste-water had been passed through it, had a pH of 9.3. The flow rate throughout the experiment was 210±90 ml/day.

In order to evaluate the performance of the first column in purifying the radioactive water, the radioactivity accumulated on this column was counted over a period of 15 minutes every four hours. After another interval of 15 minutes, the radioactivity on the second column was counted over a period of 15 minutes. The detector was a 3×3" sodium iodide scintillation counter connected to a multi-channel analyzer. The peak areas corresponding to $I^{131}$ (284 KeV) and $Cs^{137}$ (662 KeV) were determined. The decontamination factor of the first column was evaluated by determining the ratio between the increase in the number of counts on the first column and the corresponding increase on the second column during each time interval throughout the experiment. At the end of the experiment the columns were dried, counted a final time (giving readings consistent with the final readings on the columns during the flow through the system) and removed. The decontamination factor for $I^{131}$ obtained by integration over the entire 3000 column volumes of the experiment was approximately 7. However, this factor did not show any deterioration throughout the experiment. While the integrated decontamination factor for the first 1500 column volumes was approximately 6, the corresponding factor for the next 1500 column volumes was approximately 8. When the synthetic solution was substituted for the Surry waste-water, the decontamination factor sharply rose to more than 40 for at least 1500 more column volumes. (This is probably due to the higher pH of the synthetic solution). The total effective capacity of the first column, i.e., the capacity for $I^{131}$ retention, which is not corrected for $I^{131}$ loss through radioactive decay, was at least 3.5 μCi and did not show any sign of approaching exhaustion toward the end of the experiment. On the other hand, the retention of the long-lived (30.2-year) $Cs^{137}$ on the first column followed a typical sorption behavior, starting with a high decontamination factor (above 400 during the passage of the first 1700 column volumes) and then characterized by a decreasing decontamination factor which reached a value of 3 by the time 3000 column volumes have passed through.

These results indicate that with respect to the short-lived (8.1-day) $I^{131}$ the effective capacity of the column is extremely large since the life-time of this radioisotope is short compared with the time required for its passage through column. It can be concluded that in the case of short-lived radio-isotopes, such as $I^{131}$, the effectiveness of the column in preventing the radio-isotope from reaching the effluent is not limited by the number of unoccupied sites available for sorption of the corresponding ion, as in the case of conventional ion-exchange of long-lived radioactive ions. The delay caused in passing through the column due to isotopic exchange with inert iodine ions sorbed on active sites in the column, which is identical in principle with the delay generally used in chromatographic columns, provides a further effective barrier against $I^{131}$ leakage provided that this delay is sufficiently long to permit the depletion of a large fraction of the $I^{131}$ through radioactive decay while still on the column. The ultimate total effective capacity is accordingly limited only by the dissolution of the column. In the present experiment, the total length of the first column decreased from 3.6 cm to 2.1 cm by the time 6000 column volumes have passed through. The dissolution was largely confined to the bottom (the $Na^+$-exchanged glass) section of the first column, while the top (the $Hg^{2+}$-exchanged glass) of the first column and the entire second column remained intact.

This example shows that the effective capacity of such columns with respect to ions of short-lived radio-isotopes can be much larger than the capacity with respect to the corresponding long-lived species (cf. Example 1). This principle can be extended to ions of other short-lived radio-isotopes, such as $^{24}Na$ (15 hours) or $^{140}Ba$ (13 days).

The following procedure can be used to establish a process which will greatly extend the capacity of a sorption medium for a radioactive isotope with a short half-life:

(1) Establish the capacity, $n_v$, of the medium with a non-radioactive experiment or some other way such as in Example 9.

(2) From knowledge of influent concentration and requirements on effluent, the decontamination factor (DF) can be determined.

(3) The required hold time ($T_h$) can be obtained from the above DF and the half-life $\tau$ in days:

$$T_h = \tau \times \log DF / \log 2$$

(4) The flow rate ($F_R$) in term of column volumes per time (CV/time) can be calculated, i.e., Flow Rate $= CV/T_h = F_R$.

(5) The volume of the column ($V_C$) can now be calculated by using the volume of water needed to be processed per day, $V_W$.

$$V_C = \frac{V_W}{F_R}$$

As an illustration, $I^{131}$ $\tau = 8$ days.
$n_v = 4000$ CV (approximate capacity of Example 7).
Required DF $= 4$.
Volume of solution to be cleaned $= 60$ m$^3$/day.

$$\text{Hold time } T_h = \frac{\tau \log 4}{\log 2} = 2 \times \tau = 16 \text{ days}$$

$$\text{Flow Rate} = \frac{4000 \, CV}{16 \, \text{days}} = 250 \, CV/\text{day}.$$

$$\text{Volume of Column} = \frac{60 \, m^3}{250} = 0.24 \, m^3.$$

Under these conditions, if an iodide ion enters the column in day one, it will be sorbed in many sites and after the capacity (4000 CV), if it has not decayed, it will leave the column 16 days later (4000 CV/250 CV/day). However, in 16 days three-quarters of the $I^{131}$ will have decayed to xenon$^{131}$. Thus, the effective decontamination factor of the column is 4. Since the decontamination factor is only dependent on the hold time in the column, the column can be operated beyond its capacity. In fact, the limit of use will depend upon other factors such as clogging, dissolution or deterioration of the medium.

EXAMPLE 8

The previous example showed that a large decontamination factor for a stream containing $I^{131}$ (as well as other radioactive ionic species) can be obtained using an Hg-treated porous glass column operated over a period corresponding to the passage of a large number of column volumes. This conclusion was based on a comparison between the rates of accumulation of radioactivity measured on two porous glass columns operated in series. The present example demonstrates that these findings are substantiated by a direct comparison between the influent entering the first column and the effluent leaving the second column, thus eliminating the possibility that a significant fraction of the radioactive species passes through both columns without having been sorbed and removed from the solution.

A system consisting of two porous glass ion-exchanger columns arranged in series was set up as detailed in Example 7. The dimensions of the columns and the composition of the ion-exchanger (0.6 ml of Na-exchanged glass at the bottom of each column, 0.4 ml of Hg-exchanged glass at the top) were the same as those reported in Example 7. The only distinct feature of the present Example was that the effluent of the second column was fed into a valve serving as a sampling port which permitted collection of the solution for counting instead of being discharged as in the previous Example.

The columns were back-washed with 500 ml of deionized water. Next, the testing solution was passed through the columns. The test solution contained 80 mg/l Na (introduced in part as NaOH and in part as NaCl), 230 mg/B (introduced as $H_3BO_3$), 7 mg/l Ca (introduced as $CaCl_2$), 60 mg Cl$^-$ (*resulting from the introduction of NaCl and CaCl$_2$*), $5.6 \times 10^{-4}$ μCi/ml $I^{131}$, $3.5 \times 10^{-4}$ μCi/ml $Cs^{137}$ and $0.6 \times 10^{-4}$ μCi/ml $Co^{60}$. This solution had a pH of $(7.75 \pm 0.25)$. The flow rate throughout the experiment was $(250 \pm 40)$ ml/day.

Two independent methods were used in order to evaluate the performance of the porous glass ion exchangers. The first method, based on comparison between the rate of increase in radioactivity counted on the first column and the rate of increase counted on the second column, is described in detail in Example 7. The second method consisted of direct comparison between the amount of radioactivity in the influent solution entering the first column and the corresponding amount in the effluent solution leaving the second column. The same counting geometry was used for the two solutions. The technique and duration of counting were described in Example 7.

The results of radioactive counting of the influent and effluent solutions over various intervals during the experiment are given in Table I along with the results of the comparison between the two columns.

TABLE I

| | Experimental Decontamination Factors | | | |
|---|---|---|---|---|
| Number of | Column 1/Column 2 Ratios | | Influent/Effluent Ratios | |
| Column Volumes | $I^{131}$ | $Cs^{137}$ | $I^{131}$ | $Cs^{137}$ |
| 0–475 | 40–120 | 60–170 | 30 | 55 |
| 475–1232 | 3 | 30 | 11 | >150 |
| 1232–1494 | 1.5 | 20 | 4 | >15 |

The generally larger ratios obtained by comparing the influent with the effluent (except during the initial stage) agree with expectations since they represent combinations of the decontamination efficiencies of both the first and the second columns. In Examples 7 and 8 combined bed medium is used and the column volumes refer to both Hg and Na glass. Thus, when referring to the Hg-exchanged glass, all $I^{131}$ data apply to a number of column volumes larger by a factor of $1.0/0.4 = 2.5$ than the numbers shown above, and, when referring to the Na-exchanged glass, all $Cs^{137}$ data apply to a number of column volumes higher by a factor of $1.0/0.6 = 1.7$.

The capacities of the columns in Example 8 for sorption of radioactive species are somewhat lower than the capacities reported in Example 7. This may be due to differences between the porous glass ion-exchange materials used in the two cases which were prepared under similar but not completely identical conditions (for instance, the materials used in Example 8 were stored for longer periods). However, a more likely cause is the difference between the influent compositions used in the two cases—the influent used in Example 8 contained much less Na, much more Ca and had a much lower pH compared with the influent used in Example 8. In any case, the data presented in Example 8 show that the results obtained for the performance of a single decontaminating column by means of a comparison with a sequentially installed second column are substantiated by findings based on conventional influent/effluent comparison, and that both sets of data demonstrate that the Hg-exchanged porous glass has a very high capacity for the removal of radioactive iodide from the stream, while the Na-exchanged porous glass is very effective in removing radioactive cesium.

EXAMPLE 9

This example shows that mercury-exchanged porous glass exhibits a drastically higher capacity in removing $I^{131}$ from an aqueous medium compared with several other ion-exchange materials which, based on their compositions, could be considered promising candidates for use in effective I removal.

In addition to Hg-exchanged porous glass, prepared according to the procedure described in Example 7, an Ag-exchanged porous glass was prepared using the same procedure except for the fact that during stage (ii) of the treatment of the ammonia-exchanged glass the concentration of Hg (introduced as $HgCl_2$) in the loading solution was replaced by an identical concentration (7500 ppm) of Ag (introduced as $AgNO_3$).

The same two treatments, i.e., an Hg-exchange according to stages (i), (ii) and (iii) of Example 7 and an Ag-exchange according to the procedure detailed in the previous paragraph, were carried out on two different samples of a commercial zeolite (Union Carbide Corp. Linde Div. IONSIV Ion-exchanger Type IE-95) which has previously been treated with ammonia according to the procedure detailed at the beginning of Example 2.

The same two treatments, i.e., Hg-exchange and Ag-exchange, were also carried out on two different samples of IONSIV IE-95 which had not been pre-treated with ammonia.

Another sample of IONSIV IE-95 was tested in its oriqinal form without any previous treatment.

All solids were analyzed from dopant (Hg or Ag) content by means of DC plasma spectroscopy following acid dissolution.

The test procedure used in all cases involved placing in a 125-ml polyethylene container a volume of 0.5 ml of the wet powder along with a volume of 50 ml of a solution prepared by dissolving 1.720 g $H_3BO_3$, 0.0914 g NaOH, 0.042 g $Ca(NO_3)_2.4H_2O$ and 0.033 g NaCl in 1 L of deionized water, mixing well and adding 5 $\mu$Ci or $I^{131}$ (introduced as iodide solution). The pH of the solution was (7.75±0.25). The containers were tumbled continuously on their sides at a speed of 45 r.p.m. on a rock tumbler for 16.3 hours, and this period was followed by ten cycles, each including 5 minutes of tumbling and 5 minutes without tumbling, in order to ensure effective mixing. A volume of 25 ml of the liquid phase was removed for radioactive counting over a period of 10 minutes using the scintillation counter described in Example 7. A blank reading was made on a volume of 25 ml of liquid taken from an identical bottle which contained for the same period of time a volume of 50 ml of the original test solution without the presence of a powder. The capacity $n_v$ of each powder in sorbing and removing $I^{131}$ from the solution, expressed in equivalent column volumes, was determined using the expression $$n_v = \frac{C_B - C_S}{C_S} \frac{V_L}{V_S}$$

where $C_B$ is the number of counts obtained for the blank over a certain period of counting, $C_S$ is the number of counts measured during an equal period for an equal volume of solution which has been shaken with a solid sample, $V_S$ is the volume of the wet solid powder and $V_L$ is the total volume of liquid with which it has been mixed.

The results of the measurements on the various tested materials were as follows:

| Solid Material | No. of $I^{131}$ Counts/ 10 Minutes | Capacity, Equivalent/ Column Volumes | Milliequivalents Per Gram, me/g | Capacity Divided By me/g |
| --- | --- | --- | --- | --- |
| None (blank) | 235954 | | | |
| Non-exchanged non-pretreated zeolite | 264628 | — | 0 | — |
| Ag-exchanged, non-pretreated zeolite (10.0% Ag) | 185748 | 27 | .93 | 29 |
| Hg-exchanged, non-pretreated zeolite (0.39% Hg) | 240134 | — | .02 | — |
| Ag-exchanged, $NH_3$-pretreated zeolite (8.7% Ag) | 195954 | 20 | .81 | 25 |
| Hg-exchanged, $NH_3$-pretreated zeolite (2.25% Hg) | 168848 | 40 | .11 | 364 |
| Ag-exchanged, $NH_3$-pretreated porous glass (4.4% Ag) | 167323 | 41 | .41 | 100 |
| Hg-exchanged, $NH_3$-pretreated porous glass (0.66% Hg) | 28585 | 725 | .033 | 22,000 |

The results show that the Hg-exchanged porous glass exhibits an exceptionally high capacity for $I^{131}$ sorption and removal from solution, exceeding by factors of at least 18 the capacities of similar materials based on zeolites instead of porous glass and/or loaded with Ag instead of Hg. Even in the case of the zeolite, however, the capacity for iodide sorption when sufficient mercury is present calculated *per atom* of heavy metal present in the sorbing medium is more than 10 times larger in the case of mercury than in the case of silver.

The results of the above experiments seem to indicate the following:

(a) Iodide is sorbed on sites provided by the presence of mercury.
(b) The sorption process is controlled by the number of sites rather than by an equilibrium condition provided other halide ions are not present.
(c) The sorption process is highly selective and is unaffected by the presence of a 50-fold excess of borate over iodide.
(d) Each mercury site can adsorb approximately two iodide ions provided other halide ions are not present.
(e) A maximum amount of mercury can be loaded on a glass when pre-treatment and loading are carried out with ammonium-based solutions; in the presence of sodium the initial capacity for mercury is not much smaller but a major fraction of the mercury is subsequently washed out. However, sorption of iodide on the mercury sites stabilizes the mercury and halts its elution from the column.
(f) Molecular iodine, even when present in a rapidly flowing gas stream, can be effectively sorbed on a mercury-loaded glass column.
(g) Radioactively contaminated water containing a variety of radioactive ions in addition to iodide can be purified by mercury-loaded glass.
(h) The capacity of columns for ions of short-lived radio-isotopes such as $I^{131}$ can be made extremely large relative to their capacity towards comparable long-lived (including non-radioactive) ions provided the columns are designed so as to cause the time required for the radioactive ion to pass through to be long compared with the radioactive half-life.
(i) The effectiveness of Hg on zeolite in the presence of $NH_4OH$ is 10 times higher than that of Ag in a per atom basis for the sorption of iodide with excess of chloride present.
(j) A higher capacity with respect to iodine sorption is obtained when the media is treated with both ammonia and mercury.

Any mercury dissolved during the flow tests of Examples 1–4 and 6 may have interferred with chemical analysis for iodide. This effect was not present in the radioactive tests in Examples 7–9.

EXAMPLE 10

This example demonstrates the use of a charcoal support in combination with selected metal complexing groups with and without pretreatment with amines.

Types of Charcoal

Two types of commercial charcoal were used. The first type denoted "F" is sold by Fisher Scientific Company, Pittsburgh, Pa., as Activated Carbon catalog number 05-690A. The second type denoted "B" is sold by Barnebey-Cheney, Columbus, Ohio, as UU-type steam activated coconut shell carbon having a surface area larger than 1100 m$^2$/g.

Pretreatment

Selected charcoal samples were pretreated with a solution having 200 g/l triethylenediamine in deionized water. Ten grams (10 g) of charcoal were rolled at 1 rpm for 24 hours in 100 ml of the solution. The solution was decanted and the sample was washed with 200 ml of deionized water.

Metal Complexing Group Treatment

A solution was prepared by dissolving 2.86 g $H_3BO_3$ in 900 ml deionized water, dissolving the equivalent of 0.25 g of the complexing group metal in the solution, adding water to adjust the volume to one liter, and adjusting the pH with NaOH. Ten milliliter (10 ml) of charcoal was rolled at 1 rpm for 48 hours in the solution and washed three times with 50 ml of water (each time).

Testing

The ion exchange/sorption media was loaded into a glass column between two stainless steel frits. A Dow Nuclear Grade SBR Anion Exchanger in the hydroxide form available from Dow Chemical Co., Midland, Michigan was used as a control sample since it is the industry standard for the removal of iodide.

higher than the control. Thus, a slow delivery of the metal to the charcoal may prolong the column life.

| | Charcoal Type | Pre-Treatment | Metal | Salt Type | g/l | pH | CV | DF |
|---|---|---|---|---|---|---|---|---|
| Control | | | | | | | 500 | 63.1 |
| | | | | | | | 1,000 | 50.2 |
| | | | | | | | 5,000 | 28.2 |
| | | | | | | | 10,000 | 15.9 |
| | | | | | | | 18,000 | 6.3 |
| Test #1 | F | No | | | | | 195 | 1.50 |
| | | | | | | | 470 | 1.06 |
| | | | | | | | 740 | 1.02 |
| Test #2 | F | Yes | | | | | 110 | 3.37 |
| | | | | | | | 400 | 1.25 |
| | | | | | | | 900 | 1.16 |
| | | | | | | | 1,280 | 1.00 |
| Test #3 | F | Yes | Hg | HgCl$_2$ | 0.338 | 6.8 | 60,600 | 269 |
| | | | | | | | 65,600 | 17 |
| Test #4 | B | No | Hg | HgCl$_2$ | 0.338 | 6.8 | 40,100 | 128.0 |
| | | | | | | | 44,350 | 31.0 |
| | | | | | | | 58,300 | 18.0 |
| | | | | | | | 67,100 | 3.8 |
| Test #5 | B | Yes | Hg | HgCl$_2$ | 0.338 | 6.8 | 35,000 | 109.0 |
| | | | | | | | 39,700 | 51.0 |
| | | | | | | | 52,800 | 30.0 |
| | | | | | | | 56,900 | 5.8 |
| | | | | | | | 61,400 | 4.2 |
| Test #6 | F | No | Ag | AgNO$_3$ | 0.394 | 6.7 | 41,000 | 97 |
| | | | | | | | 63,200 | 20 |
| Test #7 | F | No | Pb | Pb(NO$_3$)$_2$ | 0.4 | 5.5 | 2,900 | 62.0 |
| | | | | | | | 9,150 | 1.04 |
| Test #8 | F | No | Cu | Cu(NO$_3$)$_2$.3H$_2$O | 0.95 | 5.3 | 755 | >400.0 |
| | | | | | | | 5,850 | 18.3 |
| | | | | | | | 19,400 | 1.9 |
| Test #9 | F | No | | Hg Glass (Example 3) | | | 1,000 | 60 |
| | | | | | | | 50,000 | 30 |
| | | | | | | | 90,000 | 10 |

The solution to be passed through the column was made up to have:
1.69 g/l H$_3$BO$_3$
0.042 g/l Na$_2$B$_4$O$_7$.10H$_2$O
0.037 g/l CaCl$_2$.2H$_2$O
0.032 g/l NaCl
and 600 nCi/L of I$^{131}$ dissolved in deionized water. The sample size used was 1 ml of solution.

The solution was flowed through the column at a rate of 220 ml/hr and had a residence time of 16 sec. The solution represents a typical waste water composition for a pressurized water reactor (PWR). The following table lists typical decontamination factors (DF) for given column volumes (CV).

The untreated charcoal (Test 1) and the pre-treated charcoal without the metal complexing group (Test 2) were very ineffective in removing radioactive iodide in comparison with the control. The best results were obtained with Hg (see Tests 3–5). By comparing Tests 4 and 5, the non-pretreated charcoal is slightly better than the pre-treated charcoal. By comparing Tests 3 and 6, it is noted that Ag, although not quite as good as Hg, is comparable and greatly superior to the control.

Tests 7 and 8 demonstrate metals (Pb and Cu) that have high initial DF but limited capacity. This is probably because the metals are washed off the charcoal support as the experiment proceeds.

In order to prevent the metal from being washed off, an additional Test 9 was conducted. Mercury (Hg) glass from Example 3 was placed on top of a layer of untreated charcoal (F). The resulting DFs were much higher than in Example 7 (mercury treated glass) or Test 1 (untreated charcoal) and the capacity was much higher than the control. Thus, a slow delivery of the metal to the charcoal may prolong the column life.

The foregoing description of our invention has been directed to particular details in accordance with the requirements of the Patent Act and for purposes of explanation and illustration. It will be apparent, however, to those skilled in this art that many modifications and changes may be made without departing from the scope and spirit of the invention. It is further apparent that persons of ordinary skill in the art will, on the basis of this disclosure, be able to practice the invention within a broad range of process conditions. It is our intention in the following claims to cover all such equivalent modifications and variations as fall within the true scope and spirit of the invention.

What is claimed is:

1. A process for removing iodide anions form a liquid containing said iodide anions which comprises passing said liquid over a composition comprising a porous charcoal having interconnected pores, and characterized in that its internal surface contains complexing groups of heavy metal cations selected from the group consisting of mercury and silfer capable of forming a stable complex with iodine, said cations being present in an amount effective to complex the iodide anions, said amount being at least about 0.001% by dry weight, and forming a complex between the heavy metal cations of said composition and said iodide anions.

2. The process of claim 1 wherein said heavy metal cations are mercury cations.

3. The process of claim 1 wherein said heavy metal cations are silver cations.

4. The process of claim 1 wherein said charcoal has a specific area in the range of about 500 to 2000 m$^2$/g.

5. The process of claim 1 wherein said charcoal is prepared by the destructive distillation of wood.

6. The process of claim 1 wherein the heavy metal cations are present in an amount of at least about 0.01% by dry weight.

7. The process of claim 1 wherein the heavy metal cations are present in an amount of at least about 0.1% by dry weight.

8. The process of claim 1 wherein the heavy metal cations are present in an amount of about 0.01 to 10% by dry weight.

9. The process of claim 1 wherein said iodide anims oil radioactive iodide anioms.

10. The process of claim 9 wherein said composition continues to remove radioactive iodide anims after its capacity for chloride ion is substantially exhausted.

11. The process of claim 1 wherein said liquid further contains chloride ion and which further comprises forming a complex between the heavy metal cations and said chloride ion.

12. The process of claim 1 wherein said liquid passes over a source composition upstream of said porous charcoal and said source composition slowly releases said complexing groups of heavy metal cations.

13. The process of claim 12 wherein said liquid passes over a trap composition downstream of said porous charcoal and said trap composition substantially removes any said heavy metal cations present in said liquid.

14. The process of claim 9 wherein the time required for said radioactive iodide anions to pass over said composition is caused to be long compared to the half-life of said radioactive iodide anions.

* * * * *